(12) United States Patent
Kurisu et al.

(10) Patent No.: US 10,430,027 B2
(45) Date of Patent: Oct. 1, 2019

(54) DISPLAY CONTROL DEVICE, PROGRAM, AND IMAGE DISPLAY METHOD

(71) Applicant: NTT DOCOMO, INC., Tokyo (JP)

(72) Inventors: Toshiharu Kurisu, Tokyo (JP); Maki Sasaki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 198 days.

(21) Appl. No.: 15/323,798

(22) PCT Filed: Sep. 29, 2015

(86) PCT No.: PCT/JP2015/077510
§ 371 (c)(1),
(2) Date: Jan. 4, 2017

(87) PCT Pub. No.: WO2016/052500
PCT Pub. Date: Apr. 7, 2016

(65) Prior Publication Data
US 2017/0192630 A1 Jul. 6, 2017

(30) Foreign Application Priority Data
Sep. 29, 2014 (JP) ................................ 2014-198905

(51) Int. Cl.
*G06F 3/0482* (2013.01)
*G06F 3/0481* (2013.01)
(Continued)

(52) U.S. Cl.
CPC .......... *G06F 3/0482* (2013.01); *G06F 3/0346* (2013.01); *G06F 3/04817* (2013.01);
(Continued)

(58) Field of Classification Search
CPC ... G06F 3/0482; G06F 3/04817; G06F 3/0346
See application file for complete search history.

(56) References Cited

U.S. PATENT DOCUMENTS

2007/0089071 A1* 4/2007 Zinn ........................ G06F 8/38
715/844
2011/0010673 A1 1/2011 Takeda
(Continued)

FOREIGN PATENT DOCUMENTS

EP 2017724 A1 1/2009
EP 2477104 A1 7/2012
(Continued)

OTHER PUBLICATIONS

International Search Report issued in corresponding PCT Application No. PCT/JP2015/077510, dated Dec. 15, 2015, pp. 1-4.
(Continued)

*Primary Examiner* — Shourjo Dasgupta
(74) *Attorney, Agent, or Firm* — MKG, LLC

(57) ABSTRACT

A display control device including at least: extraction unit configured to extract a plurality of items that are to be displayed; and display control unit configured to display a plurality of images that correspond to the plurality of extracted items, in a predetermined arrangement on a screen such that the plurality of images are cyclically movable. Display control unit is configured to determine whether or not each of the plurality of extracted items satisfies a predetermined condition, and responsive to stopping cyclic movement of the plurality of images, display an image that corresponds to an item that satisfies the predetermined condition, out of the plurality of images, at a particular position.

8 Claims, 6 Drawing Sheets

(51) Int. Cl.
*G06F 3/0346* (2013.01)
*G09G 5/00* (2006.01)
*G09G 5/38* (2006.01)
*H04M 1/725* (2006.01)

(52) U.S. Cl.
CPC ............. *G09G 5/00* (2013.01); *G09G 5/38* (2013.01); *H04M 1/7258* (2013.01); *H04M 1/72572* (2013.01); *G09G 2340/14* (2013.01); *G09G 2354/00* (2013.01)

(56) References Cited

U.S. PATENT DOCUMENTS

| | | | | |
|---|---|---|---|---|
| 2012/0054343 | A1* | 3/2012 | Sticker | H04L 41/0896 709/225 |
| 2012/0066618 | A1* | 3/2012 | Barker | G06F 17/30185 715/753 |
| 2012/0218303 | A1 | 8/2012 | Nakada | |
| 2013/0339902 | A1* | 12/2013 | Katzman | G06F 3/0482 715/810 |

FOREIGN PATENT DOCUMENTS

| | | |
|---|---|---|
| JP | 2005209174 A | 8/2005 |
| JP | 2006252276 A | 9/2006 |
| JP | 2008542867 A | 11/2008 |
| JP | 2009020760 A | 1/2009 |
| JP | 2012174149 A | 9/2012 |
| JP | 2013117843 A | 6/2013 |
| WO | 2006126050 A1 | 11/2006 |

OTHER PUBLICATIONS

Notification of Reasons for Refusal issued in corresponding Japanese Application No. JP 2016-552059 dated May 2, 2017, pp. 1-3.
Extended European Search Report issued in corresponding European Application No. 15845874.5 dated Apr. 30, 2018, 8 pages.

* cited by examiner

| ITEM | EVENT NAME | TIME CONDITION | GEOGRAPHICAL CONDITION | PRIORITY LEVEL |
|---|---|---|---|---|
| NEWS | BREAKING NEWS | WHEN BREAKING NEWS IS ISSUED | ANYWHERE | Lv10 |
| | MORNING | WEEKDAY MORNING DURING MORNING COMMUTE | ANYWHERE | Lv7 |
| | EVENING | WEEKDAY EVENING DURING MORNING COMMUTE | ANYWHERE | Lv7 |
| HOUSEHOLD ELECTRICAL APPLIANCE OPERATION | OUTING | AUTHORIZED | OUT OF HOME | THIRD GROUP |
| | NOT ALLOWED TO OPERATE HOUSEHOLD ELECTRICAL APPLIANCE | UNAUTHORIZED | OUT OF HOME | Lv9 |
| | AT HOME | ANYTIME | AT HOME | THIRD GROUP |
| ... | ... | ... | ... | ... |

FIG. 12

DISPLAY CONTROL DEVICE, PROGRAM, AND IMAGE DISPLAY METHOD

TECHNICAL FIELD

The present invention relates to display of information.

BACKGROUND ART

When a plurality of images such as icons are displayed, there are cases in which the plurality of images are arranged according to a predetermined rule. In such a situation, there also are cases in which a particular image is highlighted or displayed in a mode that is different from the mode in which other images are displayed (see JP 2008-542867A, for example).

When a particular image is displayed so as to be distinguishable from the other images out of a plurality of images, if the particular image is specified without any condition, there is the possibility of such display not contributing to user convenience.

SUMMARY

In view of the above, an object of the present invention is to limit images that are to be displayed at a particular position.

According to one aspect of the present invention, there is provided a display control device, including an extraction unit that extracts a plurality of items that are to be displayed; and a display control unit that displays a plurality of images that correspond to the plurality of extracted items, in a predetermined arrangement on a screen such that the plurality of images are cyclically movable. The display control unit is configured to determine whether or not each of the plurality of extracted items satisfies a predetermined condition, and responsive to stopping cyclic movement of the plurality of images, display an image that corresponds to an item that satisfies the predetermined condition, out of the plurality of images, at a particular position.

The display control unit may be configured to determine, for each of the plurality of extracted items, whether or not one or more pieces of content are associated with the item, and responsive to stopping movement of the plurality of images, display an image corresponding to an item with which at least one piece of content is associated, out of the plurality of images, at the particular position.

The display control unit may be configured to move or stop the plurality of images in response to a user operation.

The display control unit may be configured to, responsive to stopping the cyclic movement of the plurality of images, predict an image that is expected to be displayed at the particular position, and if an item corresponding to the predicted image does not satisfy the condition, cause the plurality of images to behave in a different manner such that an image that is different from the predicted image is displayed at the particular position.

The extraction unit may be configured to extract items that correspond to time and date or a user position.

The display control unit may be configured to display, on the screen, information regarding an image that is to be displayed at the particular position.

The display control device may include: a detection unit that detects an event; and a changing unit changes relative positions of the plurality of images during the cyclic movement thereof according to the event detected by the detection unit.

The display control device may include: a detection unit that detects an event; and a changing unit that changes an appearance of an image that corresponds to the event detected by the detection unit, out of the plurality of images, so as to be different from appearances of other images.

According to another of the present invention, there is provided a program for causing a computer to execute the steps of: extracting a plurality of items that are to be displayed; displaying a plurality of images that correspond to the plurality of extracted items, in a predetermined arrangement on a screen such that the plurality of images are cyclically movable; determining whether or not each of the plurality of extracted items satisfies a predetermined condition; and responsive to stopping cyclic movement of the plurality of images, displaying an image that corresponds to an item that satisfies the predetermined condition, out of the plurality of images, at a particular position.

According to yet another of the present invention, there is provided an image display method including the steps of: extracting a plurality of items that are to be displayed; displaying a plurality of images that correspond to the plurality of extracted items, in a predetermined arrangement on a screen such that the plurality of images are cyclically movable; determining whether or not each of the plurality of extracted items satisfies a predetermined condition; and responsive to stopping cyclic movement of the plurality of images, displaying an image that corresponds to an item that satisfies the predetermined condition, out of the plurality of images, at a particular position.

The present invention makes it possible to limit images that are to be displayed at a particular position.

BRIEF DESCRIPTION OF THE DRAWINGS

FIG. 12 is a diagram showing an example of an event table.

DETAILED DESCRIPTION

1. Embodiment

Figure 1:
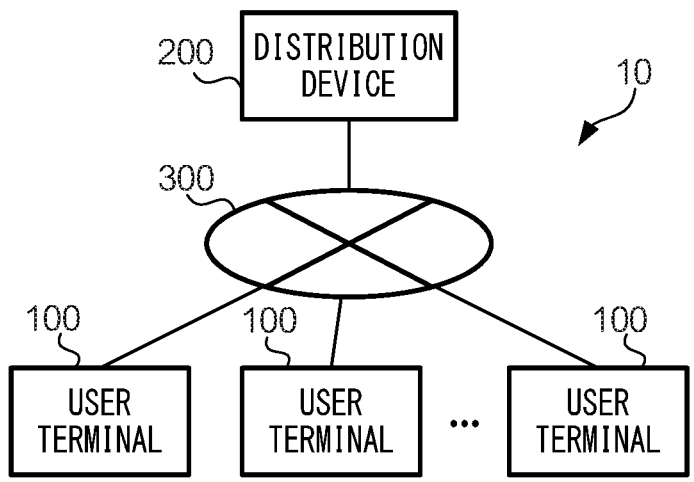
FIG. 1 is a block diagram showing an example of a configuration of information distribution system 10.

FIG. 1 is a block diagram showing an example of a configuration of information distribution system 10 according to an embodiment of the present invention. Information distribution system 10 is a computer system used for browsing content. Information distribution system 10 includes a plurality of user terminals 100 and distribution device 200, which are connected to each other via network 300. Network 300 is, for example, the Internet or a mobile communication network.

Here, "content" is information represented as characters, images, audio, and so on, and is also referred to as "digital content". Types of content according to the present embodiment include, for example, weather information (weather forecasts, weather warnings, etc.), information regarding facilities such as a restaurant, and information regarding an event such as a concert or an exhibition. Types of content according to the present embodiment are not limited to content distributed from distribution device 200, but also include content generated by user terminal 100. Note that content may be a web page, and may be any kind of data as long as the data is in a format that can be used on user terminal 100.

User terminal 100 is an electronic device that is owned and carried by a user. User terminal 100 is, typically, a smartphone or a tablet terminal. User terminal 100 has at least the function of outputting content. User terminal 100 is an example of a display control device according to the present invention.

Figure 2:
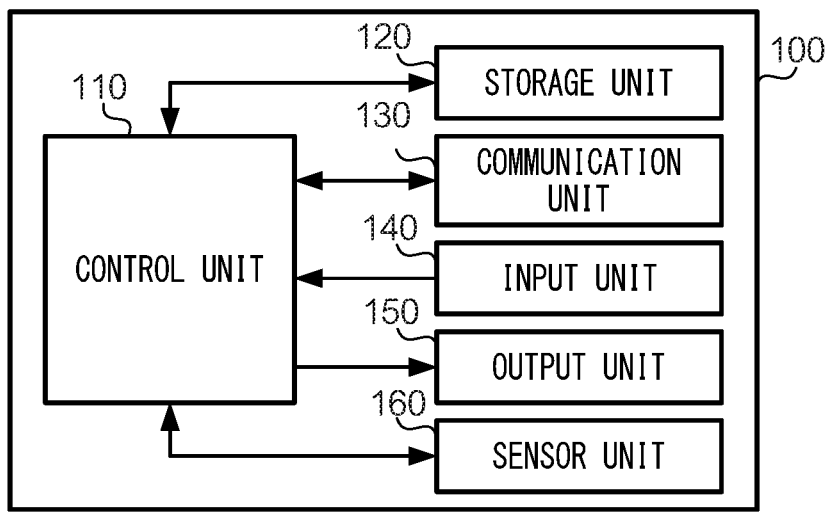
FIG. 2 is a block diagram showing an example of a hardware configuration of user terminal 100.

FIG. 2 is a block diagram showing an example of a hardware configuration of user terminal 100. User terminal 100 includes control unit 110, storage unit 120, communication unit 130, input unit 140, output unit 150, and sensor unit 160.

Control unit 110 is a means for controlling the operations of each unit of user terminal 100. Control unit 110 includes an arithmetic processing unit such as a central processing unit (CPU) or an application processor, and a memory (main storage device), and controls the operations of each unit of user terminal 100 by executing programs. The programs executed by control unit 110 include a program for controlling display of a menu screen described below (hereinafter referred to as "menu control program").

Storage unit 120 is a means for storing data. Storage unit 120 includes a storage medium such as a flash memory. This storage medium may be attachable to and detachable from user terminal 100. Storage unit 120 is capable of storing data that is required for control unit 110 to operate, content that has been received from a distribution device, and so on.

Communication unit 130 is a means for transmitting and receiving data via network 300. Communication unit 130 includes a baseband processor and an antenna, performs modulation and demodulation suited for network 300, and thus performs data transmission/reception. Communication unit 130 receives content from distribution device 200 via network 300.

Input unit 140 is a means for receiving input data. Input unit 140 includes a keypad and a microphone. In a case where a display unit is configured with a touch screen display, input unit 140 may include a sensor portion of the touch screen display.

Output unit 150 is a means for outputting data. Output unit 150 includes at least a display unit that is configured with a liquid crystal display or the like. The display unit according to the present embodiment is configured with a touch screen display. Output unit 150 may include a speaker. Here, "output" is not limited to "display".

Sensor unit 160 is a means for detecting changes in the state of user terminal 100 and the user, and includes a plurality of sensors. Sensor unit 160 includes, for example, a global positioning system (GPS) module that detects the position of user terminal 100. Sensor unit 160 may also include an accelerometer that detects acceleration generated by the movement of user terminal 100, and a gyroscope that detects the inclination of user terminal 100. Furthermore, sensor unit 160 may be capable of detecting the environment around user terminal 100, such as temperature, pressure, humidity, illumination (brightness), and so on, and may measure the heart rate of the user using a heartbeat sensor.

Distribution device 200 is a server device for distributing content. Distribution device 200 stores a plurality of pieces of content, and transmits, to each user terminal 100, a piece of content corresponding to the user of user terminal 100. Pieces of content stored in distribution device 200 may have been created and provided by another business operator (a content provider).

Figure 3:
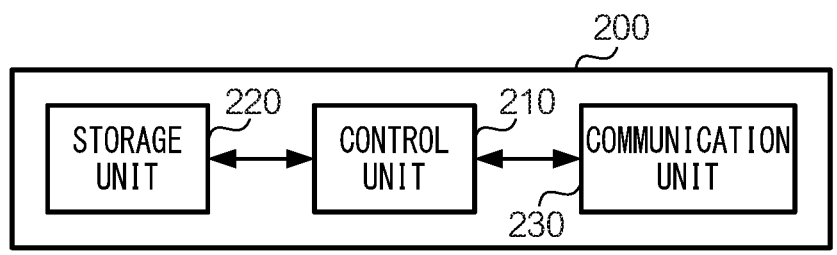
FIG. 3 is a block diagram showing an example of a hardware configuration of distribution device 200.

FIG. 3 is a block diagram showing an example of a hardware configuration of distribution terminal 200. Distribution device 200 includes control unit 210, storage unit 220, and communication unit 230. Note that distribution device 200 may be realized using a plurality of server devices cooperating with each other, instead of being realized as a single device.

Control unit 210 is a means for controlling the operations of each unit of distribution device 200. Control unit 210 includes an arithmetic processing unit such as a CPU and a memory. Control unit 210 is capable of distributing, to each user, a piece of content that corresponds to the user, at predetermined timing, by executing a program for controlling content distribution to each user.

Storage unit 220 is a means for storing data. Storage unit 220 includes a storage medium such as a hard disk, and stores data required for control unit 210 to operate, pieces of content that are to be distributed to user terminals 100, and so on.

Communication unit 230 is a means for transmitting and receiving data via network 300. Communication unit 230 is capable of transmitting pieces of content to user terminals 100, and is also capable of receiving pieces of content from an external server device or the like as appropriate.

The configuration of information distribution system 10 is as described above. User terminal 100 displays pieces of content in response to a user operation. When displaying pieces of content, user terminal 100 displays a menu screen. On this menu screen, pieces of content are displayed in the state of being classified into a plurality of items. Note that each piece of content has been associated with any one of the items.

Figure 4:
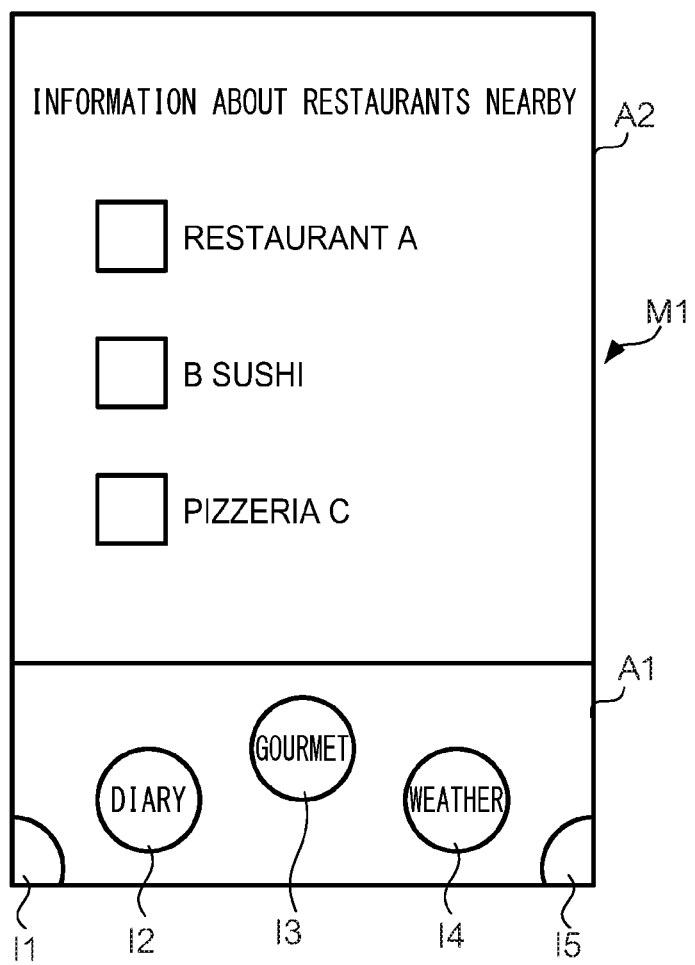
FIG. 4 is a diagram showing an example of a menu screen.

FIG. 4 is a diagram showing an example of the menu screen. Menu screen M1 includes area A1 and area A2. Area A1 is an area for displaying images (specifically, image objects such as icons) that correspond to the items to which the pieces of content are classified. Area A2 is an area for displaying information regarding particular icons out of the icons displayed in area A1 (hereinafter referred to as "related information").

In this example, five icons I1 to I5 are arranged in area A1. However, the number of icons that can be displayed in area A1 is not limited to five, and may be six or more. In this example, only some of the icons that can be displayed are displayed in area A1. In each icon, characters and images that represent the item (e.g., schedule, weather, transit planner, or neighborhood food/drink information) that corresponds to the icon, are displayed, for example. Here, icon I3 corresponds to the item for displaying food/drink information (information regarding restaurants or the like) based on the position of user terminal 100. Icon I4 corresponds to the item for displaying information regarding alarming weather (heavy rain, thunder, tornado, etc.) when such information has been issued to the position of user terminal 100 (or a predetermined region).

User terminal 100 changes the icon displayed in area A1 according to a user operation. Specifically, upon a user performing a drag operation or a flick operation (an operation to quickly slide a finger on the screen) in the left or right direction on the area A1, user terminal 100 controls display in area A1 such that the icon moves in the operation direction. User terminal 100 controls the moving speed of the icon in proportion to the moving speed of the finger of the user.

Figure 5:
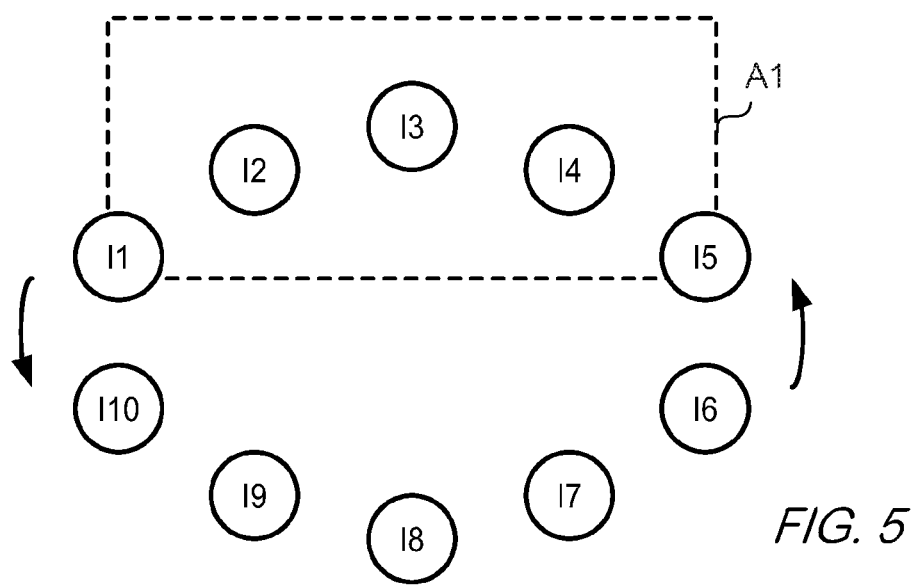
FIG. 5 is a conceptual diagram illustrating a mode in which icons are displayed.
Figure 6:
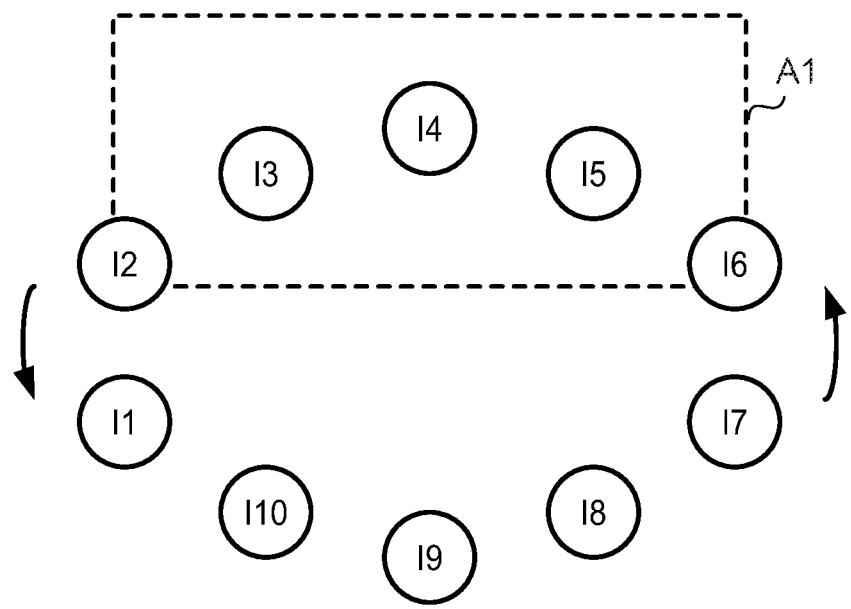
FIG. 6 is a conceptual diagram illustrating a mode in which icons are displayed.
Figure 7:
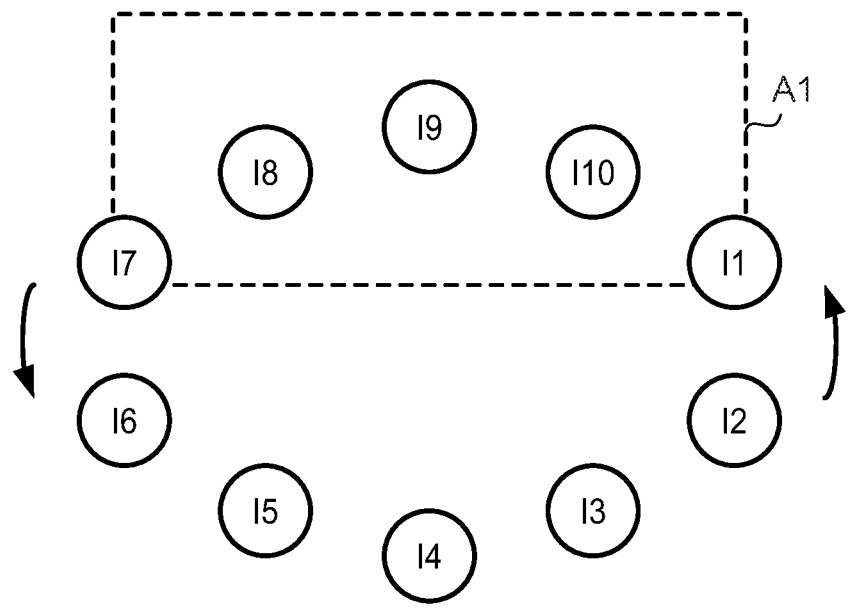
FIG. 7 is a conceptual diagram illustrating a mode in which icons are displayed.

FIGS. 5 to 7 are conceptual diagrams illustrating a mode in which icons are displayed. In this example, the number of icons to be displayed is "10", and the number of icons to be displayed in menu screen M1 (specifically, in area A1) at a time is "5". User terminal 100 displays icons I1 to I10 in a predetermined arrangement such that the icons are cyclically movable. Here, "cyclic movement" means that the icons are moved so as to be repeatedly displayed in the same order. For example, FIG. 5 shows the initial arrangement of icons I1 to I10, i.e., a situation before the icons I1 to I10 are cyclically moved. Here, icons according to the present embodiment are classified into the following three groups (i.e., the plurality of items are classified into the following three groups).

(1) First group: icons to be displayed at a predetermined position in area A1 (the center in this example) in the initial arrangement.

(2) Second group: icons to be displayed at a position other than the predetermined position in area A1 in the initial arrangement.

(3) Third group: icons that are not displayed in area A1 in the initial arrangement.

In the example shown in FIG. 5, icon I3 belongs to the first group, icons I1, I2, I4, and I5 belong to the second group, and icons I6 to I10 belong to the third group.

For example, if the icons in the display state shown in FIG. 5 are moved counter-clockwise, icon I1 temporarily disappears from menu screen M1 (area A1) as shown in FIG. 6, but if the icons are thereafter continuously moved in the same direction, icon I1 is displayed in menu screen M1 again as shown in FIG. 7.

User terminal 100 stops icons at predetermined positions. In the example shown in FIG. 4, user terminal 100 stops icons such that any one of the icons is displayed at the center of area A1 and five icons are arranged in area A1 at equal intervals. Therefore, when the icons are stopped, five icons are always displayed in menu screen M1, and any one of these icons is displayed at the center of area A1.

Area A2 is an area that displays information related to the icon displayed at the center of the area A1. User terminal 100 displays, for example, a general description of the item corresponding to the icon, and some or all of the pieces of content associated with the icon, in area A2. Note that the type of information to be displayed as information related to the icon may differ for each item.

User terminal 100 executes predetermined processing upon receiving a predetermined operation (e.g. a tap operation) performed on the icon displayed at the center. For example, upon a tap operation being performed on the icon displayed at the center, user terminal 100 displays a piece of content associated with the icon, or starts up an application program associated with the icon. Note that processing executed by user terminal 100 at this time may differ for each icon (i.e. for each item).

When displaying the menu screen in such a manner, user terminal 100 controls the movement of the icons such that only an icon that satisfies a predetermined condition is displayed at the center when the icons are stopped, and icons that do not satisfy the predetermined condition are not displayed at the center when the icons are stopped. Examples of the condition mentioned here includes a condition that relates to a piece of content that is associated with the icon, for example. In the present embodiment, user terminal 100 does not allow an icon that is not associated with any piece of content to be displayed at the center of area A1, and allows other icons to be displayed at the center of area A1.

Figure 8:
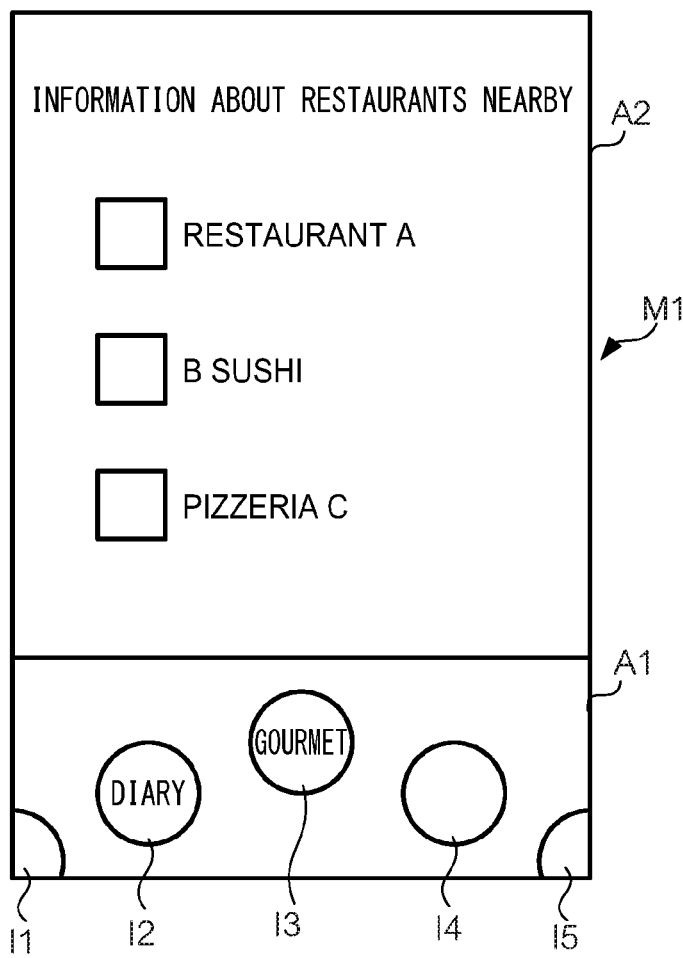
FIG. 8 is a diagram showing an example of icon display control.

FIG. 8 is a diagram showing an example of icon display control. This menu screen M1 is the same as the menu screen shown in FIG. 4. In this example, however, no piece of content is associated with the item corresponding to icon I4 (i.e. information regarding alarming weather has not been issued). In this case, user terminal 100 allows the user to recognize that no piece of content is associated with icon I4 by displaying icon I4 in a mode that is different from the mode in which other icons are displayed, e.g., by hiding the item name of icon I4. User terminal 100 also performs control to prevent the icon I4 from being displayed at the center of menu screen M1 (i.e. the position at which icon I3 is displayed in FIG. 8). Specifically, even when icon I4 is about to be displayed at the center of menu screen M1 in response to a user operation, user terminal 100 forcibly displays another icon (e.g. icon I3 or I5) at the center.

Figure 9:
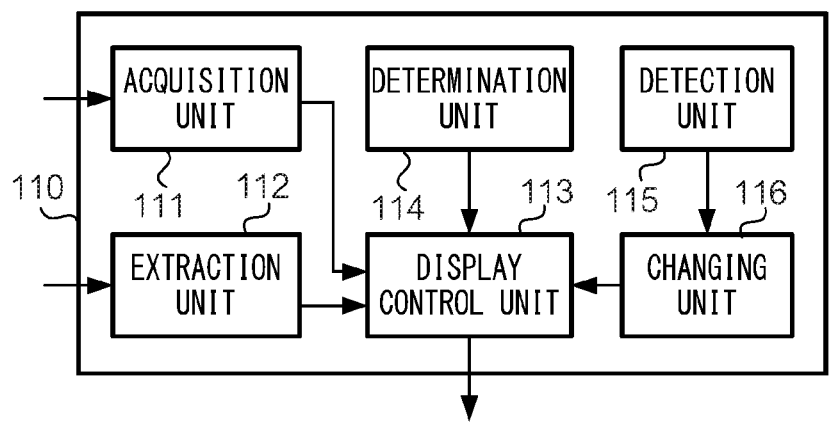
FIG. 9 is a block diagram showing an example of a functional configuration of user terminal 100.

FIG. 9 is a block diagram showing an example of a functional configuration of user terminal 100 related to icon display control. Control unit 110 of user terminal 100 realizes functions corresponding to acquisition unit 111, extraction unit 112, display control unit 113, determination unit 114, detection unit 115, and changing unit 116, which will be described below, by executing a predetermined program (a menu control program).

Acquisition unit 111 is a means for acquiring content. Acquisition unit 111 is capable of acquiring content from distribution device 200 via network 300, and is also capable of acquiring content generated in user terminal 100 or stored in user terminal 100, as content to be displayed.

Extraction unit 112 is a means for extracting items that are to be displayed on the menu screen. Specifically, extraction unit 112 extracts m items out of n items (n>m≥0). In the example shown in FIGS. 5 to 7, the value of m is "10". Note that the criterion by which extraction unit 112 extracts items is not particularly limited. For example, extraction unit 112 may extract items based on date and time at which the menu screen is displayed or the position (location) of the user. If this is the case, the user is able to browse pieces of content classified into items that correspond to the user's environment, on the menu screen. In the case of extracting items corresponding to the position of the user, extraction unit 112 identifies the position of user terminal 100 by using the GPS module of sensor unit 160.

Items to be extracted by extraction unit 112 may include items that have been determined by the user in advance.

Also, extraction unit 112 may extract items according to attribute information regarding the user. Examples of the attribute information mentioned here include information indicating the age (or the year of birth), sex, related locations (home, the district in which a workplace is located, and so on), hobbies, and preferences of the user, and this information has been registered by the user in advance. If attribute information is used, extraction unit 112 is capable of extracting items suited to a user. For example, extraction unit 112 may extract items related to fashion for users who are interested in fashion, and extract items related to sports for users who are interested in sports.

Note that acquisition unit 111 may also be configured to acquire pieces of content according to the user's environment or attribute information in the same manner as extraction unit 112 is.

Display control unit 113 is a means for controlling display of the menu screen. Display control unit 113 controls icon display as well as display of related information. Display control unit 113 determines the positions of icons extracted by extraction unit 112, and moves the icons (e.g. cyclic movement) or stops the icons in response to a user operation. Examples of control mentioned here include control of the moving speed of the icons. Determination unit 114 determines, for each of the plurality of items, whether or not the item satisfies a predetermined condition. Responsive to stopping the cyclic movement of the plurality of icons, display control unit 113 stops the icons such that an icon corresponding to the item that satisfies the predetermined condition, out of the plurality of items, is located at a particular position.

Detection unit 115 detects an event that has occurred in user terminal 100. Changing unit 116 changes the order in which the plurality of icons are arranged (the relative positions of the icons) according to the event detected by detection unit 115. Examples of the event mentioned here include an instruction from the user to change the order in which the icons are arranged. Upon the user making an instruction to change the order in which the icons are arranged, changing unit 116 changes the order in which the icons are arranged according to the instruction. Note that a given functional element (e.g. display control unit 113) may also serve as another function element (e.g. determination unit 114).

Figure 10:
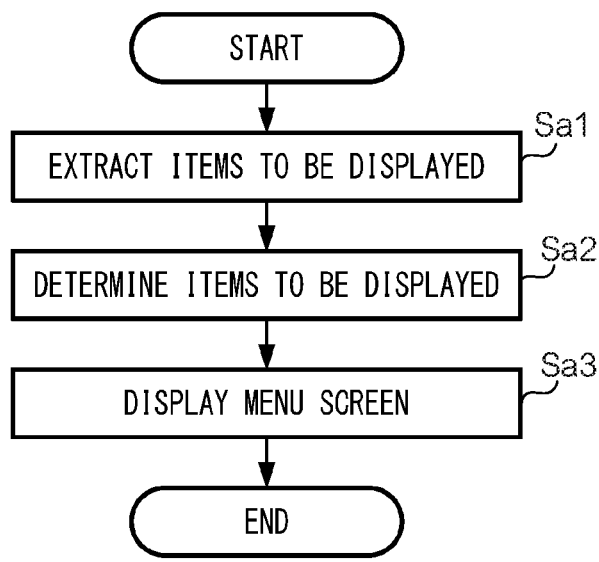
FIG. 10 is a flowchart showing an example of processing related to menu screen display.

FIG. 10 is a flowchart showing an example of basic processing related to menu screen display. When displaying a menu screen, control unit 110 of user terminal 100 first extracts a predetermined number of items that are to be displayed (step Sa1). In the case of the example shown in FIGS. 5 to 7, control unit 110 extracts ten items at this time.

Next, control unit 110 determines the arrangement of the extracted items (the order in which the extracted items are arranged), and determines items that are to be first displayed on the menu screen (step Sa2). In the case of the example shown in FIGS. 5 to 7, control unit 110 extracts five items as the items to be first displayed on the menu screen. For example, control unit 110 may first display items that are associated with pieces of content that have been frequently browsed, based on the history of user operations performed on the menu screen. Alternatively, control unit 110 may first display items that are associated with a larger number of pieces of content. Also, control unit 110 may exclude items that are not associated with any piece of content, from items to be first displayed on the menu screen.

Finally, control unit 110 displays the menu screen according to the determination made in step Sa2 (step Sa3). Here, control unit 110 also displays information related to the icon displayed at the center. Control unit 110 may display icons that are not related to any piece of content such that the icons are distinguishable from other icons. For example, if characters corresponding to items (item names) are to be displayed together with icons, control unit 110 may hide the item names of the icons with which no piece of content is associated. Also, if all of the items extracted in step Sa1 are associated with no piece of content, control unit 110 may display information indicating the fact, or extract items again.

Note that it is not necessary for control unit 110 to continuously execute the processing shown in FIG. 10 when displaying the menu screen. For example, it is acceptable that control unit 110 executes processing in steps Sa1 and Sa2 in advance, and when displaying the menu screen, i.e., upon receiving an operation that makes an instruction to display the menu screen, control unit 110 executes only processing in step Sa3.

After displaying the menu screen in this way, control unit 110 moves the icons in response to a user operation. The user is allowed to browse information related to the desired item, while moving the icons. When the movement of the icons is stopped, control unit 110 displays related information corresponding to a particular icon (the icon displayed at the center of the menu screen).

Figure 11:
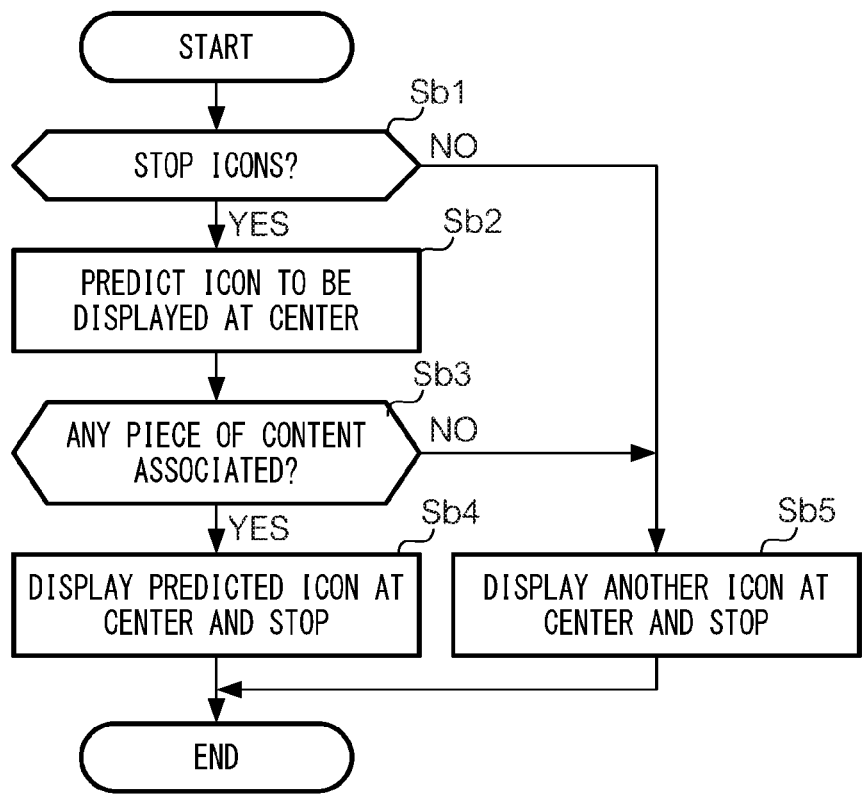
FIG. 11 is flowchart showing an example of icon display control.

FIG. 11 is a flowchart showing an example of icon display control (in particular, display control performed when the icons are stopped). During this operation, control unit 110 determines whether or not an operation to stop the icons has been performed (step Sb1). Here, examples of an operation to stop the icons include an operation to decelerate the movement of the icons. Upon such an operation being performed, control unit 110 gradually reduces the moving speed of the icons, and eventually stops the icons. For example, upon a flick operation being performed on an icon, control unit 110 may move the icons at a constant moving speed, or gradually decelerate the icons.

Upon an operation to stop the icons being performed, control unit 110 specifies the icon that is expected to be displayed at the center of the menu screen (step Sb2). In other words, control unit 110 predicts the icon that is to be displayed at the center of the menu screen. However, as described below, this predicted icon is not necessarily displayed at the center of the menu screen.

Here, regarding the icon specified (predicted) in step Sb2, control unit 110 determines whether or not the item corresponding to the icon satisfies a predetermined condition. Specifically, control unit 110 determines whether or not any piece of content is associated with the item corresponding to the icon (step Sb3). If at least one piece of content is associated with the item corresponding to the icon specified in step Sb2, control unit 110 stops the movement of the icons, with the specified icon being displayed at the center of the menu screen as per the prediction (step Sb4).

On the other hand, if no piece of content is associated with the item corresponding to the icon specified in step Sb2, control unit 110 stops the icons such that the icons behave in a manner that is different from the manner in which the icons are stopped in step Sb4. Specifically, control unit 110 stops the movement of the icons, with an icon that is different from the icon specified in step Sb2 being displayed at the center of the menu screen (step Sb5). Examples of the other icon mentioned here include the icon that is next to the icon specified in step Sb2, i.e., the icon that is expected to be displayed at the center of the menu screen. In this case, if no piece of content is associated with the item corresponding to the next icon, control unit 110 may display the icon that is next to the next icon at the center of the menu screen.

As described above, according to the present embodiment, it is possible to limit icons that are to be displayed at a particular position to icons that satisfy a predetermined condition. For example, in the present embodiment, items and pieces of content to be displayed on the menu screen might vary according to the user's environment (e.g. the date and time, the position). Therefore, the number of pieces of content that can be displayed might decrease depending on the user's environment. According to the present embodiment, in such a case, it is possible to prevent an icon from being displayed at a particular position even though there is no piece of content that is displayable. Also, according to the present embodiment, the arrangement of icons does not change depending on the presence or absence of a piece of content, and it is possible to achieve a uniform screen design. Furthermore, it is possible to achieve uniform operability. Therefore, it is less likely that the user feels uncomfortable or will be confused, compared to when the number of icons to be displayed, for example, varies depending on the presence or absence of a piece of content.

2. Modifications

Modes in which the present invention is carried out are not limited to the above-described embodiment. The following is an example of another embodiment of the present invention. Note that the present invention may be carried out by appropriately combining the above-described embodiment and one or more modifications.

2-1. First Modification

User terminal 100 may move the icons without a user operation. For example, user terminal 100 may control the movement of the icons using a predetermined application program. Also, user operations are not necessarily limited to a flick operation and a tap operation performed on the touch screen display, and the icons may be moved or stopped by pressing a key, for example.

2-2. Second Modification

The menu control program may automatically change the display positions of the icons (or the order in which the icons are arranged) upon detection of an event other than the event of the input of a user instruction, based on at least one of: the attributes of the user; the attributes of user terminal 100; and the attributes of an item or a piece of content. For example, upon the occurrence of an event that has been set for an item, the menu control program displays the icon corresponding to the item in a mode that is more noticeable to the user. Note that "displays . . . in a mode that is more noticeable to the user" means that the display positions of the icons (the relative positions of the plurality of icons) are changed. This change is made while the icons are not cyclically moved (i.e., the initial arrangement of the icons before the cyclic movement is changed). Alternatively, this change may be made while the icons are cyclically moved. Events that are set for the items or the pieces of content respectively are stored in storage unit 120 in the form of an event table. The menu control program controls display of the icons with reference to this table.

FIG. 12 is a diagram showing an example of the event table. The event table includes "item", "event name", "time condition", "geographical condition", and "priority level". "Event name" indicates an identifier of an event. "Time condition" indicates a time condition based on which an event is issued. "Geographical condition" indicates a geographical condition based on which an event is issued. "Priority level" indicates how the priority level is changed. Events are set for each item, each piece of content, or each classification (category) of content.

For example, events "breaking news", "morning", and "evening" are set for the "news" item (a piece of content classified into "news"). For example, out of these events, the event "breaking news" is an event that is issued when breaking news happens, irrespective of the current position of user terminal 100. When this event is issued, the priority corresponding to the item is forcibly set to "level 10". Priority levels (levels 1 to 10 in this example, where level 10 is the highest) are set to each item to be displayed, and the order in which the icons corresponding to the item are arranged is determined based on the priority levels. That is, the groups, out of the first to third groups, to which the icons corresponding to the item belong, are determined. Icons corresponding to a level-10 item is classified into the first group. When a news item is set to level 10, the priorities of the other items are each lowered by one.

In another example, events "outing", "user who is not allowed to operate household electrical appliance", "at home" are set for the item corresponding to a household electrical appliance operation (e.g. an application program for operating a household electrical appliance). Among these events, the event "outing", for example, is issued when the user can operate the household electrical appliance (the user has been authorized to perform a remote control operation) and the user is out of the home. When this event is issued, the priority level corresponding to the item is forcibly rewritten with a value belonging to the third group. The event "at home" is an event that is issued when the user is at home. When this event is issued, the priority level corresponding to the item is forcibly rewritten with a value belonging to the third group. A specific value of the priority level with which the item forcibly belongs to the third group varies depending on the relationship with the priority levels of other items at the time. In this example, the icon corresponding to the item for which an event that lowers the priority level has been detected is changed to the third group, i.e., the initial position of the icon is moved to the outside of the display area.

Note that the priority levels are not necessarily directly specified as shown in FIG. 12. For example, it is acceptable that a base score is set to each item, and the event table stores parameters used for increasing or reducing the base scores. The priority levels are determined based on the relative magnitude relationship between the scores. When an event is issued, the menu control program calculates the score by using the parameter associated with the event, and determines the priority level based on the magnitude relationship with the scores of the other items. The menu control program determines the display positions of the icons based on the priority levels thus determined.

Note that the events shown in FIG. 12 are merely examples, and events are not limited to them. The present embodiment is applicable to various combinations of items and events, for example, when a new notice related to an item "notice from a local government" is issued, or when a bargain related to an item "advertisement" is released from a retail store such as a supermarket.

2-3. Third Modification

In the second modification, the menu control program may change the appearance (size, color, decoration, etc.) of an icon corresponding to an item for which an event has been detected, so as to be different from the appearances of other icons, instead of, or in addition to changing the display positions of the icons. "Different appearance" means that the color, the size, the decoration and so on are different. "Decoration and so on" means changing display of the icon in terms of time by causing the icon to blink, for example, and adding an image to the icon. For example, the menu control program displays the icon corresponding to the item for which an event has been detected, so as to be larger in size than the other icons. Alternatively, the menu control program causes the icon corresponding to the item for which an event has been detected to blink (without causing the other icons to blink). Note that the relationship between "item", "event name", "time condition", "geographical condition", and "method for appearance change" is recorded in the event table as described in the second modification.

The appearance change is started when the icons are at the initial positions before the cyclic movement is started, for example. Alternatively, the appearance change may be performed after the cyclic movement of the icons has been started. The appearance change ends (the appearance is restored) when an operation (e.g. a touch operation) is performed on an icon when the icon is displayed at a predetermined position within area A1, for example. Alternatively, the appearance change may end when the icon is displayed at a predetermined position within area A1 (when the icon is stopped at the predetermined position, or passes the predetermined position).

2-4. Fourth Modification

The menu control program may display icons belonging to the first group so as to have an appearance that is different from the appearances of the icons belonging to the other groups. The different appearance is the same as that described in the third embodiment. For example, the menu control program may display icons belonging to the first group so as to be larger than the icons belonging to the other groups. Alternatively, the menu control program may cause the icons belonging to the first group to blink.

2-5. Fifth Modification

The number of icons belonging to each of the first to third groups is not limited to the number described in the embodiment as an example. For example, three icons may belong to the first group. If this is the case, area A2 displays information related to a particular icon (e.g. the icon at the center) out of the icons belonging to the first group. Alternatively, information related to a plurality of icons may be displayed in area A2.

2-6. Sixth Modification

In the present invention, the condition to be applied to display of icons is not limited to the presence or absence of a piece of content that is associated with the icon. For example, user terminal 100 may make a determination based on whether or not the number of pieces of content associated with the item is larger than a predetermined threshold, or based on the operation history of the user.

2-7. Seventh Modification

In the above-described embodiment, the number of icons that can be displayed on the menu screen at a time is smaller than the number of icons that can be displayed. However, user terminal 100 may display all the icons to be displayed on the menu screen at the same time. In other words, the menu screen may be configured such that all the icons to be displayed are displayed, and no icon is hidden.

2-8. Other Modifications

Some of the functions of user terminal 100 shown in FIG. 9 as examples may be omitted. For example, at least one of extraction unit 112, detection unit 115, and changing unit 116 may be omitted.

The display control device according to the present invention is not limited to user terminal 100 described above, i.e., is not limited to a smartphone or a tablet terminal. The display control device according to the present invention may be, for example, a portable game machine, a music player, or a so-called personal computer.

Also, the present invention can provide not only a display control device (or an electronic apparatus including the display control device) but also an information distribution system including the display control device and the distribution device, a program for causing a computer (a CPU or the like) to serve as the display control device, and an icon display method. The program may be provided by being recorded on a recording medium such as an optical disc, or being downloaded to a predetermined device via a network such as the Internet and being installed to the device.

REFERENCE SIGNS LIST

10 . . . Information distribution system, 100 . . . User terminal, 110 . . . Control unit, 120 . . . Storage unit, 130 . . . Communication unit, 140 . . . Input unit, 150 . . . Output unit, 160 . . . Sensor unit, 111 . . . Acquisition unit, 112 . . . Extraction unit, 113 . . . Display control unit, 200 . . . Distribution device, 300 . . . Network.

The invention claimed is:

1. A display control device, comprising:
a processor; and
a memory;
the processor configured to:
extract a plurality of items to be displayed; and display a screen including a first area and a second area, the first area being an area for displaying a plurality of images that correspond to the plurality of extracted items, in a predetermined arrangement on the first area such that the plurality of images moves cyclically, the second area being an area for displaying an item corresponding to a specific image that stops at a specific position,
wherein the processor is further configured to
determine whether each of the plurality of extracted items satisfies a predetermined condition, and
responsive to a user's instruction, move the plurality of images cyclically, and
if a first image, corresponding to a first item that does not satisfy the predetermined condition, is predicted to stop at the specific position, change behavior of the cyclic movement such that a second image, corresponding to a second item that satisfies the predetermined condition, stops at the specific position.

2. The display control device according to claim 1, wherein the predetermined condition is that
an item is associated with at least one piece of content.

3. The display control device according to claim 1, wherein the processor is further configured to move or stop the plurality of images in response to a user operation.

4. The display control device according to claim 1, wherein the processor is further configured to extract items that correspond to time and date or a user position.

5. The display control device according to claim 1, wherein the processor is further configured to:
detect an event; and
change relative positions of the plurality of images during the cyclic movement thereof according to the event detected by the processor.

6. The display control device according to claim 1, wherein the processor is further configured to:
detect an event; and
change an appearance of an image that corresponds to the event detected, out of the plurality of images, so as to be different from appearances of other images.

7. A program stored on a non-transitory computer readable medium for causing a computer including a processor to execute the program, the processor configured to:
extract a plurality of items that are to be displayed;
display a screen including a first area and a second area, the first area being an area for displaying a plurality of images that correspond to the plurality of extracted items, in a predetermined arrangement on the first area such that the plurality of images are cyclically movable, the second area being an area for displaying an item corresponding to a specific image that stops at a specific position;

determine whether or not each of the plurality of extracted items satisfies a predetermined condition; and responsive to a user's instruction, move the plurality of images cyclically, and if a first image, corresponding to a first item that does not satisfy the predetermined condition, is predicted to stop at the specific position, change behavior of the cyclic movement such that a second image, corresponding to a second item that satisfies the predetermined condition, stops at the specific position.

8. An image display method comprising:

extracting a plurality of items that are to be displayed;

displaying a screen including a first area and a second area, the first area being an area for displaying a plurality of images that correspond to the plurality of extracted items, in a predetermined arrangement on the first area such that the plurality of images are cyclically movable, the second area being an area for displaying an item corresponding to a specific image that stops at a specific position;

determining whether or not each of the plurality of extracted items satisfies a predetermined condition; and responsive to a user's instruction, move the plurality of images cyclically, and if a first image, corresponding to a first item that does not satisfy the predetermined condition, is predicted to stop at the specific position, change behavior of the cyclic movement such that a second image, corresponding to a second item that satisfies the predetermined condition, stops at the specific position.

* * * * *